UNITED STATES PATENT OFFICE.

ALBERT C. CLINE, ALONZO H. CROWELL, AND CHARLES M. McCORKLE, OF NEWTON, NORTH CAROLINA, ASSIGNORS OF TWO-EIGHTHS TO SAID CLINE, THREE-EIGHTHS TO SAID CROWELL, AND THREE-EIGHTHS TO SAID McCORKLE.

HEALING COMPOUND FOR CLOSING TIRE-PUNCTURES.

1,233,753.   Specification of Letters Patent.   Patented July 17, 1917.

No Drawing.   Application filed June 13, 1916.   Serial No. 103,538.

*To all whom it may concern:*

Be it known that we, ALBERT C. CLINE, ALONZO H. CROWELL, and CHARLES M. McCORKLE, citizens of the United States, all residing at Newton, in the county of Catawba and State of North Carolina, have invented certain new and useful Improvements in Healing Compounds for Closing Tire-Punctures; and we do hereby declare the following to be a full, clear, and exact description of the invention, such as will enable others skilled in the art to which it appertains to make and use the same.

Our invention relates to compounds intended to close punctures in the casings or inner tubes of automobile tires, particularly, whether such punctures are occasioned by accident or result from defective manufacture.

Punctures of the kind indicated are, of course, generally the result of accidental encounter of the traveling tire with sharp-edged or pointed objects, such as nails, pieces of glass, etc.

Our compound is placed in the tire or tube when it is manufactured, or before it is placed in use, and travels and slides around and coats or covers the inside of the tire or tube, particularly that side toward the outer face of the tire, being thrown there largely by centrifugal force.

The compound is slippery and easily moves about. If a puncture occurs, the pressure of air within the tire or tube tends to produce an escape of air at this point, and this tendency carries with it a current or stream of the compound which immediately fills the hole and stops the leak.

Our compound we prefer to make after the following formula:

11 parts of amphibole chrysolite asbestos steatite, or soapstone, powdered, these being all substantial equivalents of each other.
2 parts graphite shale, comminuted.
2 parts kaolin, comminuted.
1 part red iron ocher, comminuted.

The proportions may be varied, but the foregoing is the formula which we prefer to use and have found most useful. Probably the most effective of the ingredients is the asbestos. The graphite shale and steatite or soapstone produces some of the effects of a lubricant, that is, rendering the compound mobile, while the kaolin or iron ocher give the compound body and fill the interstices left by the flakes or spicules of the other ingredients.

The compound is more efficient when accompanied by a menstruum by which it may be carried around easily. A suitable menstruum is plain water, although this may be thickened in some instances with advantage by any of the ordinary viscosity producing agents, such as glue, gum, or water glass.

We have found upon tests, that holes purposely created in an automobile tire by driving nails of the tenpenny size through the tire, are permanently and almost instantly cured, and that the tire so treated stands up under travel as well as though it had not been injured.

Having thus described our invention, what we claim as new and desire to secure by Letters Patent, is:

1. A compound for sealing holes in tires comprising asbestos, graphite shale, kaolin and red iron ocher, powdered.

2. A compound consisting of eleven parts of asbestos powdered, two parts of graphite shale, two parts of kaolin, and one part of red iron ocher, powdered.

3. A compound for sealing tires consisting of eleven parts of powdered asbestos, two parts of graphite shale, and sufficient kaolin and red iron ocher to give the compound body, the whole being adapted to be mixed with a vehicle.

In testimony whereof, we affix our signatures.

ALBERT C. CLINE.
ALONZO H. CROWELL.
CHARLES M. McCORKLE.